Patented May 9, 1939

2,157,334

UNITED STATES PATENT OFFICE 2,157,334

CELLULOSIC COATING

John R. Haines, Detroit, Mich., assignor to Detroit Macoid Corporation, Detroit, Mich., a corporation of Michigan No Drawing. Application December 7, 1936, Serial No. 114,622

2 Claims. (Cl. 134—79)

The present invention relates to plastic or coating compositions and particularly to such compositions wherein an element of the binder or film-forming component is of a cellulosic nature.

Prior to the present invention such plastic or coating compositions have been of two general classes—(1) those designated as thermoplastic, and (2) those designated as air drying. The thermoplastic compositions generally were caused to coalesce under conditions of controlled heat and pressure so as to form a film or a plastic body. The air drying compositions were of a fluid consistency and possessed the property of ready flowability so as to cover a surface to be coated. Such compositions coalesced and dried to form coherent films under normal conditions of atmospheric temperature and pressure.

Air drying compositions of the prior art were useful only as and for the purpose of forming relatively thin films upon an article or surface to which they were applied. Such films were generally limited in thickness to less than approximately .005 inch due to the fact that the fluidity of the composition was generally achieved by the use of solvents, thinners and diluents, which when the film dried caused porosity of the film and impaired its cohesion on the surface to be coated. In addition, while such films may be said to dry in a comparatively few minutes time, the complete evaporation required a very long period as the jell-like film formed during the drying acted as a sponge to hold small amounts of the solvent which escaped more slowly.

It is an object of the present invention to provide a plastic or coating composition adapted to form an air drying coating on a surface, the coating having a controlled thickness of from approximately .005 inch to .032 inch, which coating when applied to the surface is of a fluid character and which when dried thereon has the appearance and density substantially the same as that of a thermoplastic body.

It is a further object of the invention to provide a plastic or coating composition which is of suitable consistency to permit dipping, spraying, or brushing for applying the composition to the surface to be coated, which composition dries under normal atmospheric temperatures and pressures to form a thick substantially imperforate coating having thicknesses in excess of .005 inch, the coating when dried possessing the characteristics of a high-grade plastic including relatively high film and tensile strength and being of sufficient toughness to be very resistant to abrasion and useful under conditions of extreme usage and wear.

A further object of the invention is to provide a plastic or coating composition of an air drying type which may be applied as a single film having a thickness in excess of approximately .005 inch and which will adhere by cohesion to a surface to be coated, said film when formed being substantially imperforate and possessing a relatively high degree of elasticity.

A further object of the invention is to provide a plastic or coating composition which combines the properties of a thermoplastic and an air drying coating composition, which, however, has the fluidity of an air drying coating composition and forms a film upon exposure to air under normal temperatures and pressures, which film possesses the properties of a thermoplastic shell of equivalent thickness.

Another object of the invention is to provide a plastic or coating composition which may be applied to a rubber surface to form a protective and ornamental coating thereon possessing sufficient elasticity to permit distortion of the rubber without damage to the coating.

Other objects and advantages of this invention will appear in the following description and appended claims. It is to be understood that the phraseology or terminology employed herein is for the purpose of description and not of limitation, and it is not intended to limit the invention claimed herein beyond the requirements of the prior art.

The present invention proceeds in part upon my discovery that air drying plastic or coating compositions can be prepared for the purpose of forming a dense imperforate and elastic film having thicknesses in excess of approximately .005 inch, which film will coalesce at normal atmospheric temperatures and pressures, such as through a temperature range of approximately 18.33° C. to approximately 37.78° C., the composition being of such a nature that it may be sprayed, brushed, or used as a dipping bath to cover the surface to be coated, these properties being imparted to the composition in part by the use of active or volatile solvents having a balanced rate of evaporation with regard to their rate of diffusion through the film, i. e. the vapor tension of the active or volatile solvent is such that it will evaporate from the surface of the film at substantially the same rate that it is forced outward through the film during the critical period at which the film takes a set. During the initial stage, i. e. during the evaporation of the first approximately 30% of the volatile solvent, the rate of diffusion will exceed the rate of evaporation. During the final stage, i. e. when the final approximately 30% of volatile solvent is evaporated, the rate of diffusion is slower than the rate of evaporation. However, these differences in rate of diffusion and evaporation do not affect the quality of the film since in the first stage the film is sufficiently fluid to re-cohere after passage of the solvent outwardly therethrough and in the final stage the film has set. During the intermediate stage, i. e. during the evaporation of approximately 30% to 70% of the volatile solvent, the rate of diffusion and the rate of evaporation are substantially equal at approximately 50%. However, the approximate balancing of the rates during this period is such as to avoid rupturing of the film during this critical period in its formation. As will be seen, the strength of the film correspondingly increases as the rate of diffusion decreases. This balancing of the rate of diffusion and evaporation of the volatile solvent prior to the evaporation of 70% of the volatile solvent prevents the formation of a surface skin or casing before setting of the entire film is effected.

The invention is illustrated, by way of example, in the following examples of compositions embodying the present invention. In each of the following examples, the volatile or solvent mix possesses certain general characteristics which caused its selection. Each has a vapor pressure at 25° C., from 12 to 55 mm. of mercury, preferably around 45 mm. If volatile or solvent mixtures having higher vapor pressures are utilized, it has been found that there is a tendency to cause the formation of a skin or hard membrane before the body of the film dries, with the result that gas bubbles or pinholes are formed as the membrane is ruptured due to the vapor pressure of the remaining solvent in the film. If vapor pressures of less than 12 mm. of mercury are utilized, it will be found that the drying of the film is too slow to be wholly practical.

The selected active solvents hereafter set forth have in common a molecular weight of above approximately 80. While some latitude may be permitted in the molecular weight in the particular solvent mixture used, it has been found that substances of molecular weights lower than 80 have a tendency to form gas pockets and pinholes in the finished film.

The solvent mix hereinafter specified does not contain more in any instance than approximately 20% by weight of diluents and the preferred solvent mixture contains no diluents. In some of the examples it will be found that a reference is made to substances commonly used as diluents, which are essentially non-solvents for the cellulosic esters present. Such bodies are used only as a solvent for the plasticizers which are added, and if added, do not have any deleterious effect upon the nitrocellulosic film formation. The solvent mixture used also contains in no instance more than approximately 40% of a latent solvent and preferably contains less than approximately 20%.

The plasticizers hereinafter specified may be either of a fluid type, such for example as dibutyl phthalate, tricresyl phosphate, or the like, or may be of a solid type, such for example as camphor or the alkyd resins, as for example the reaction product of phthalic anhydride, sebasic acid, and glycerin. The amount of plasticizers used depends upon the use to which the composition is to be put and also upon the amount of flexibility desired in the finished coating. I have found from experience that if a fluid plasticizer is used, the best ratio of plasticizer to nitrocellulose is from approximately 25% to approximately 35%, calculated on the basis of the dry weight of the nitrocellulose present in the mixture. In the same manner I have determined that where a solid plasticizer is used, the proportions of plasticizer to nitrocellulose may be increased so as to be from approximately 35% to approximately 80% of the dry weight of the nitrocellulose. Also the percentage of plasticizer is affected by the type of cellulose employed. For example, if the acetate or the mixed ester type of cellulose is utilized, the proportion of plasticizer required is approximately 20% less than in the cases where the plasticizers are used with the nitrocelluloses. Also the character of particular plasticizers must be considered, as all plasticizers are not compatible with all of the cellulose esters which might be used, but to one skilled in the art the method of selecting such plasticizers is well known.

As a general rule, a plasticizer for ethyl cellulose need not exceed approximately 15% by weight of the ethyl cellulose. However, for benzol cellulose the percentage of plasticizer to cellulose can run considerably in excess of the 15% figure.

In formulating a coating composition of the present invention adapted particularly for use on extremely flexible surfaces, such for example as soft rubber, it has been found that the ratio of plasticizer to cellulose should be increased to the highest possible point without causing tackiness in the finished film. For example, in using a fluid plasticizer such as hydrogenated methyl abietate, this percentage will be approximately 150% of the dry weight of the cellulose. Approximately the same proportions of butyl acetyl ricinoleate and castor oil may be used. However, in using castor oil it is preferable to use a blown or bodied or blended castor oil rather than the raw oil since its tendency to spew is not nearly so great as the raw oil.

The combination of the various phthalates or phosphates with one or more of the above mentioned oils can also be used as a plasticizer in amounts of between 100% and 150% of the cellulose. However, in using the solid type of plasticizers such as the alkyd type resin containing phthalic anhydride, sebacic acid, glycerin reaction product, the percentage of alkyd resin to cellulose may be as high as 225% of the weight of the dry cellulose, particularly if the nitrated celluloses are utilized.

When using the acetate or mixed ester type of cellulose derivatives, the plasticizers used should be somewhat less than that above mentioned and for this reason it has been found that the acetate or mixed ester type of cellulose derivatives do not formulate as satisfactory a flexible covering for soft rubber as do the cellulose nitrate esters. This, however, is due primarily to the scarcity of suitable plasticizing agents. Plasticizers of the toluene sulfonamid type, either in conjunction with triphenyl phosphate or the glycol esters, will produce a satisfactory covering of a flexible nature for use with soft rubber from the acetate or mixed type of cellulose derivatives. In using ethyl cellulose in the formulation to form a very flexible film, proper plasticizing agents, such as tributyl phosphate and some of the alkyd resins, may be used.

It has been found that no set rule is required in the selection of the particular plasticizer except that it be compatible with the particular type of cellulose used in the composition and that the percentage of plasticizer to cellulose should be less than the amount which imparts a tackiness to the finished film. The selection of the particular plasticizer is an important feature of coating compositions embodying the present invention, but the selection of the particular plasticizers and the particular amounts used is within the knowledge of those skilled in the art and is not, therefore, an essential feature of the present invention.

The solvent agents which may be used are solvent agents which may be identified by the foregoing characteristics and they may include, either alone or mixed with others, the following: Iso amyl acetate, secondary amyl acetate, butyl acetate (normal, secondary, and iso), ethyl acetate, diacetone alcohol, ethyl butyrate, hexyl acetate, methyl butyl ketone, and others, this list being intended to be illustrative, but not exhaustive, of the solvents which may be used.

The diluents used may be coal tar derivatives, or the like, such for example as toluol, xylol, and the like. It has been found that where such diluents are used to advantage is in connection with plasticizers such as the alkyd resins. The gasoline type hydrocarbon is not at all satisfactory.

Latent solvents which may be mixed with the active solvents above given may be alcohols, such as amyl, butyl, ethyl, hexyl, and propyl alcohols.

Example I

A liquid or plastic coating composition which may be used in a dipping tank so that the articles to be coated, such as automotive hardware, steering wheels, switches, and the like, are dipped into the tank, may comprise the following, approximate proportions by weight being given in each instance:

| | Per cent |
|---|---|
| 15–20 sec. nitrocellulose | 21.2 |
| Dibutyl phthalate (plasticizer) | 6.3 |
| Butyl acetate (active solvent) | 63.4 |
| Ethyl alcohol (latent solvent) | 9.1 |

Upon drying under normal conditions of temperature and pressure, it will be found that a film has been developed which conforms to the contour of the article dipped therein and has almost the identical characteristics of a nitrocellulose plastic sheet. The tensile strength is found to be approximately 8,000 lbs. per square inch and the film is a substantially clear nitrocellulose film. The thickness ranges from approximately .007 to .020 inch in commercial production and may be regulated within a plus or minus .001 within that range by regulation of the viscosity of the material and the speed of travel of the piece through the material.

This coating may be applied to any type of inert mass, such as metal parts, wood, plastics, or the like.

Example II

A coating composition which is particularly adapted to be sprayed on the articles on which it is to form the completed film may comprise the following, approximate proportions by weight being given in each instance:

| | Per cent |
|---|---|
| ½ sec nitrocellulose | 15.2 |
| Ethyl alcohol (latent solvent) | 6.5 |
| Dibutyl phthalate (plasticizer) | 3.7 |
| Butyl acetate (active solvent) | 57.0 |
| Butanol (latent solvent) | 15.24 |
| Butyl lactate (high boiling solvent) | 2.36 |

Example III

A coating composition adapted for use in covering rubber and which will not crack or deteriorate within the reasonable requirements of rubber parts used in motor vehicle construction, such for example as high-tension wires, bumper grommets, soft rubber steering wheels, and the like, may be formed of the following constituents, approximate proportions by weight being given in each instance:

| | Per cent |
|---|---|
| 15–20 sec. nitrated cotton | 15.7 |
| Alkyd type resin such, for example, as the reaction product of glycerin phthalic anhydride and sebacic acid (commercially known as R. G. 2) | 25.2 |
| Xylol (diluent for R. G. 2) | 9.8 |
| Toluol (also diluent for R. G. 2) | 17.7 |
| Butyl acetate (active solvent) | 25.8 |
| Butyl alcohol (latent solvent) | 5.9 |

This composition may be used in a dipping process and will be found to produce a heavy coating of approximately .020 inch in one dip. The film produced from such a composition is sufficiently elastic so that it may be used with the rubber articles above mentioned and it will be found that it does not lose elasticity with ageing.

Example IV

A coating composition which will produce a flexible covering so that it may be used on articles fabricated from rubber by the use of the spray method of application may comprise the following ingredients, approximate proportions by weight being given in each instance:

| | Per cent |
|---|---|
| ½ sec. nitrocellulose | 7 |
| Alkyd type resin such, for example, as the reaction product of glycerin phthalic anhydride and sebacic acid (commercially known as R. G. 2) | 10 |
| Ethyl alcohol (latent solvent) | 19.7 |
| Butyl acetate (active solvent) | 20.02 |
| Ethyl acetate (active solvent) | 16.65 |
| Toluol (diluent for alkyd type resin) | 23.3 |
| Butanol (latent solvent) | 3.33 |

Example V

Another composition embodying the present invention and which possesses high dielectric properties and is relatively unaffected by moisture, comprises the following ingredients, approximate proportions by weight being given in each instance:

| | Per cent |
|---|---|
| Ethylene dichloride | 46.8 |
| Butanol | 12.5 |
| Diacetone | 13.4 |
| Toluol | 14.2 |
| Ethyl acetate | 1.8 |
| Dibutyl phthalate | 2.2 |
| Rezyl 14 | 1.8 |
| Low viscosity hercose C | 7.3 |

The foregoing compositions as given do not contain pigments, fillers, coloring matter, and the like, but it is understood that such pigments, fillers, coloring matter, or the like, may be added without affecting the nature of the film either as to its application or as to its drying. The addition of such bodies may be accomplished by any of the conventional processes used in incorporating such substances into ordinary nitrocellulosic plastic or coating compositions.

A characteristic possessed in common in all of the foregoing examples is that the compositions may be sprayed or brushed on the surface of the article or the article may be dipped into a dip tank containing such compositions under normal atmospheric temperatures and pressures. After the application of the liquid coating to the surface, the film is allowed to dry, also at normal atmospheric temperatures and pressures, and will be found to be a thick substantially imperforate film having the tensile strength and other characteristics of thermoplastic bodies, such for example as Celluloid.

The invention is not limited in its scope to the particular ingredients above mentioned, but comprehends any type or kind of plastic or coating composition having as an ingredient thereof a cellulosic substance acting as a binder or a film-forming component, which composition will form dense substantially imperforate films upon a surface to be coated, such films having thicknesses ranging from .005 to .032 inch. Also the process is not limited to use with the above enumerated articles, but may be used in connection with the coating of any type or kind of article having a self-sustaining form on which it is desired to provide a protective or ornamental coating.

I claim:

1. A fluid film-forming coating composition capable of air-drying to form a film having the appearance and density of a thermoplastic body and containing a cellulose ester in an amount of approximately 7 to 21.2% by weight and a solvent mixture composed of a suitable cellulose ester solvent having a molecular weight in excess of 80 and sufficient amounts of a relatively more volatile latent solvent to produce a vapor pressure in said solvent mixture of from 12 to 55 mm. of mercury at 25° C., said solvent mixture having balanced rates of evaporation and diffusion, the nature and amounts of said ingredients being such as to be capable of forming a coherent film under conditions of normal atmospheric temperature and pressure, which film has a thickness within the range of approximately .005 to .032 inch and is characterized by its dense substantially imperforate nature, said percentages being by weight of the film-forming components of said composition.

2. A fluid film-forming coating composition capable of air-drying to form a film having the appearance and density of a thermoplastic body and containing approximately 7 to 21.2% of a cellulose ester, approximately 2.2 to 6.3% of a plasticizer, a diluent for said plasticizer, and a solvent mixture composed of approximately 15.2 to 63.4% of a suitable cellulose ester solvent having a molecular weight in excess of 80 together with approximately 5.9 to 23.03% of the lower monatomic aliphatic alcohols sufficient to produce a vapor pressure in said solvent mixture of from 12 to 55 mm. of mercury at 25° C., said solvent mixture having balanced rates of evaporation and diffusion, the nature and amounts of said ingredients being such as to be capable of forming a coherent film under conditions of normal atmospheric temperature and pressure, which film has a thickness within the range of approximately .005 to .032 inch and is characterized by its dense substantially imperforate nature, said percentages all being by weight of the film forming components of said composition.

JOHN R. HAINES.